(12) United States Patent
Ben-Eli

(10) Patent No.: US 9,831,910 B2
(45) Date of Patent: Nov. 28, 2017

(54) NOISE ESTIMATION BASED ON CONTROL MESSAGES DESTINED FOR OTHER MOBILE TERMINALS

(71) Applicant: Marvell World Trade Ltd., St. Michael (BB)

(72) Inventor: David Ben-Eli, Modiin (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 278 days.

(21) Appl. No.: 14/474,212

(22) Filed: Sep. 1, 2014

(65) Prior Publication Data

US 2015/0078187 A1 Mar. 19, 2015

(51) Int. Cl.
*H04W 4/00* (2009.01)
*H04B 1/7097* (2011.01)
*H04L 1/20* (2006.01)
*H04L 1/00* (2006.01)

(52) U.S. Cl.
CPC ........... *H04B 1/7097* (2013.01); *H04L 1/208* (2013.01); *H04L 1/0061* (2013.01)

(58) Field of Classification Search
CPC ............. H04J 2203/0076; H04L 1/004; H04L 1/0061; H04L 1/007; H04L 1/0072
See application file for complete search history.

(56) References Cited

U.S. PATENT DOCUMENTS

| | | | |
|---|---|---|---|
| 7,106,792 B2 | 9/2006 | Corbaton et al. | |
| 7,664,061 B2 | 2/2010 | Hottinen | |
| 8,301,989 B1 | 10/2012 | Griniasty | |
| 8,331,505 B2 | 12/2012 | Abrishamkar et al. | |
| 8,411,802 B2 | 4/2013 | Kim et al. | |
| 8,737,247 B1 | 5/2014 | Moshavi et al. | |
| 2001/0036150 A1 | 11/2001 | Padovani | |
| 2003/0012127 A1* | 1/2003 | Kolze | H04B 1/71 370/204 |
| 2003/0072390 A1 | 4/2003 | Corbaton et al. | |
| 2003/0092447 A1 | 5/2003 | Bottomley et al. | |
| 2003/0117941 A1* | 6/2003 | Lundby | H04J 13/0048 370/209 |
| 2004/0076224 A1 | 4/2004 | Onggosanusi et al. | |
| 2005/0002444 A1 | 1/2005 | Wei et al. | |
| 2005/0089115 A1 | 4/2005 | Hartmann et al. | |
| 2005/0220056 A1 | 10/2005 | Itoh | |
| 2006/0072652 A1 | 4/2006 | Kent et al. | |
| 2007/0054692 A1 | 3/2007 | Nie et al. | |
| 2007/0287382 A1 | 12/2007 | Catreux-Erceg et al. | |

(Continued)

OTHER PUBLICATIONS

U.S. Appl. No. 13/246,875 Office Action dated Jun. 19, 2013.

(Continued)

*Primary Examiner* — Andrew Chriss
*Assistant Examiner* — Kenan Cehic

(57) ABSTRACT

A method in a communication terminal includes receiving a signal that carries a data channel and at least a control-channel message, which has a first part that is masked with a terminal-specific code. A second part of the control-channel message that is not masked with the terminal-specific code is decoded to produce a decoded second part. The validity of decoded second part is checked. In response to deciding that the decoded second part is valid, a noise level for the data channel is estimated based on the decoded second part.

20 Claims, 2 Drawing Sheets

(56) References Cited

U.S. PATENT DOCUMENTS

| | | | |
|---|---|---|---|
| 2008/0232327 | A1 | 9/2008 | Kuroyanagi et al. |
| 2009/0016420 | A1 | 1/2009 | Kwak et al. |
| 2009/0086647 | A1 | 4/2009 | Shnaider et al. |
| 2009/0141786 | A1 | 6/2009 | Park et al. |
| 2009/0154530 | A1 | 6/2009 | Fulghum |
| 2009/0257372 | A1* | 10/2009 | Chin .................... H04L 1/1812 370/328 |
| 2009/0296563 | A1 | 12/2009 | Kishiyama et al. |
| 2009/0310707 | A1 | 12/2009 | Cheng et al. |
| 2009/0310708 | A1 | 12/2009 | Cheng et al. |
| 2009/0310715 | A1 | 12/2009 | Cairns et al. |
| 2009/0316842 | A1 | 12/2009 | Lu et al. |
| 2010/0020855 | A1 | 1/2010 | Ito et al. |
| 2010/0272168 | A1 | 10/2010 | Chappaz |
| 2010/0284443 | A1 | 11/2010 | Rosenqvist et al. |
| 2011/0150070 | A1 | 6/2011 | Kent et al. |
| 2011/0305195 | A1 | 12/2011 | Forck et al. |
| 2012/0082192 | A1 | 4/2012 | Pelletier et al. |
| 2012/0151285 | A1* | 6/2012 | Aue ................. H03M 13/3738 714/704 |

OTHER PUBLICATIONS

3GPP TS 25.308, "3rd Generation Partnership Project; Technical Specification Group Radio Access Network; High Speed Downlink Packet Access (HSDPA); Overall description; Stage 2", version 12.0.0, Release 12, 76 pages, Jun. 2014.
U.S. Appl. No.13/246,875 office action dated Sep. 30, 2013.
U.S. Appl. No. 13/231,971 Office Action dated Oct. 24, 2013.
U.S. Appl. No. 13/231,971 Office Action dated Jun. 7, 2013.
U.S. Appl. No. 13/231,971 Office Action dated Jun. 25, 2014.
Katzir et al, U.S. Appl. No. 13/231,971 dated Sep. 14, 2011.
3GPP TS 25.212, "3rd Generation Partnership Project;Technical Specification Group Radio Access Network; Multiplexing and channel coding (FDD)", version 11.7.0, Release 11, 162 pages, Mar. 2014.
U.S. Appl. No. 14/259,174 Office Action dated Nov. 13, 2015.
U.S. Appl. No. 14/629,515 Office Action dated Jan. 19, 2017.
U.S. Appl. No. 14/629,515 Office Action dated Apr. 28, 2017.

* cited by examiner

NOISE ESTIMATION BASED ON CONTROL MESSAGES DESTINED FOR OTHER MOBILE TERMINALS

FIELD OF THE DISCLOSURE

The present disclosure relates generally to communication systems, and particularly to methods and systems for noise level estimation.

BACKGROUND

The Third-Generation Partnership Project (3GPP) Wideband Code-Division Multiple Access (WCDMA) specifications define a high-speed downlink data mode called High-Speed Downlink Packet Access (HSDPA). This mode is specified, for example, in "3$^{rd}$ Generation Partnership Project; Technical Specification Group Radio Access Network; High Speed Downlink Packet Access (HSDPA); Overall description; Stage 2 (Release 12)," TS 25.308, version 12.0.0, June, 2014, which is incorporated herein by reference. In the HSDPA mode, downlink data is transmitted on High-Speed Downlink Shared channels (HS-DSCH), control messages are transmitted on High-Speed Shared Control Channels (HS-SCCH), and pilot signals are transmitted over a Primary Common Pilot Channel (P-CPICH).

U.S. Pat. No. 8,737,247, whose disclosure is incorporated herein by reference, describes techniques for data channel noise estimation using a pilot channel. A disclosed method includes receiving a Code Division Multiple Access (CDMA) carrier carrying at least a pilot channel. Differences are computed between selected soft pilot symbols received on the pilot channel. Based on the computed differences between the selected soft pilot symbols received on the pilot channel, a level of noise is estimated for a data channel that is to be transmitted on the CDMA carrier.

The description above is presented as a general overview of related art in this field and should not be construed as an admission that any of the information it contains constitutes prior art against the present patent application.

SUMMARY

An embodiment that is described herein provides a method including, in a mobile communication terminal, receiving a signal that carries a data channel and at least a control-channel message, which has a first part that is masked with a terminal-specific code. A second part of the control-channel message that is not masked with the terminal-specific code is decoded to produce a decoded second part. The validity of decoded second part is checked. In response to deciding that the decoded second part is valid, a noise level for the data channel is estimated based on the decoded second part.

In some embodiments, decoding the second part includes decoding the second part by the communication terminal even though the control-channel message is not addressed to the communication terminal. In other embodiments, the control-channel message includes a terminal-specific error detection code, and the method includes identifying that the control-channel message is not addressed to the communication terminal in response to detecting one or more errors when decoding the terminal-specific error detection code. In yet other embodiments, the error detection code includes a Cyclic Redundancy Code (CRC) that is further masked using the terminal-specific code, and identifying that the control-channel message is not addressed to the communication terminal includes unmasking the terminal-specific code prior to decoding the error detection code.

In an embodiment, the second part is encoded with an Error Correction Code (ECC), decoding the second part includes decoding the ECC to produce decoded bits, and checking whether the decoded second part is valid includes deriving hard bits from the second part, re-encoding the decoded bits with the ECC to produce re-encoded bits, and assessing a similarity measure between the hard bits and the re-encoded bits.

In another embodiment, assessing the similarity measure includes evaluating a number of bit differences between the hard bits and the re-encoded bits, and comparing the number to a predefined threshold number. In yet another embodiment, checking whether the decoded second part is valid includes evaluating a reliability level of the decoded second part and deciding that the second part is suitable for noise-level estimation when the reliability level exceeds a predefined level.

In some embodiments, the method includes combining the estimated noise level with an additional noise-level estimate obtained from an additional control-channel message that is received by the communication terminal but addressed to another communication terminal. In other embodiments, the method includes combining the estimated noise level with an additional noise-level estimate obtained from a pilot channel carried by the received signal.

In an embodiment, the method includes using the estimated noise level for estimating a Channel Quality Indicator (CQI) that indicates a quality of the data channel. In another embodiment, the method includes using the estimated noise level to derive soft decoding information to be used for recovering data messages sent over the data channel. In yet another embodiment, the method includes using the estimated noise level to adapt an adaptive loop that operates on the data channel.

There is additionally provided, in accordance with an embodiment that is described herein, apparatus including a receiver and processing circuitry. The receiver is configured to receive a signal that carries a data channel and at least a control-channel message, which has a first part that is masked with a terminal-specific code. The processing circuitry is configured to decode a second part of the control-channel message that is not masked with the terminal-specific code to produce a decoded second part, to check whether the decoded second part is valid, and, in response to deciding that the decoded second part is valid, to estimate a noise level for the data channel based on the decoded second part.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
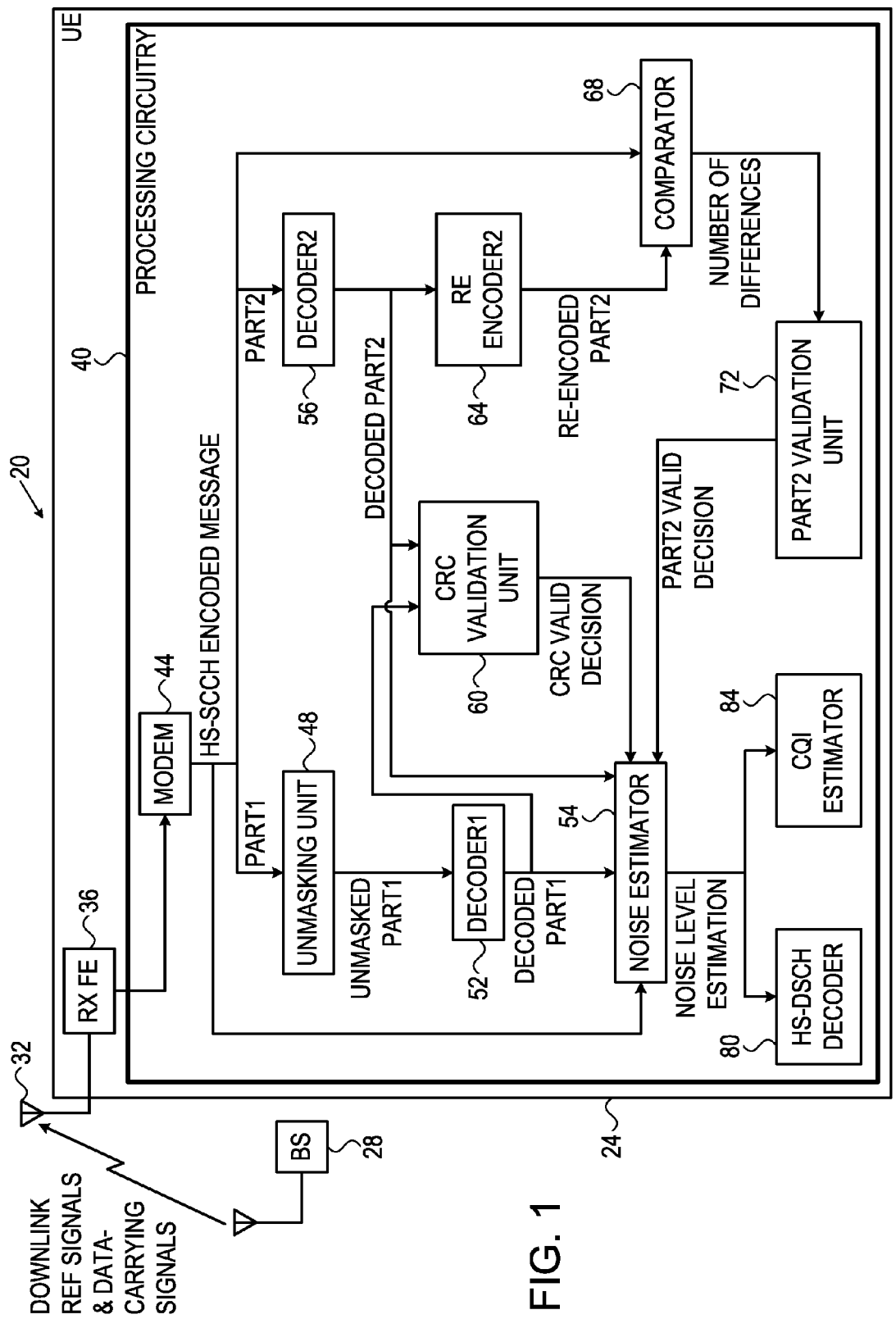
FIG. 1 is a block diagram that schematically illustrates a communication system, in accordance with an embodiment that is described herein.

Embodiments that are described herein provide improved methods and systems for noise estimation in Code-Division Multiple Access (CDMA) receivers. The disclosed techniques compute accurate noise level estimates for a data channel used for transmitting data, based on measurements that are performed on a control channel that is normally used for communicating configuration attributes of the data channel such as, for example, a modulation scheme, a block size and coding scheme and rate. Although the embodiments described herein refer mainly to reception and processing of Wideband CDMA (WCDMA) signals, e.g., Universal Mobile Telecommunications System (UMTS) signals, the disclosed techniques can be used with various other types of CDMA signals. In the present context, the term "CDMA" includes WCDMA as well as any other form of CDMA.

In some embodiments, a mobile communication terminal (referred to as User Equipment—UE) receives a CDMA carrier that carries one or more data channels and one or more control channels. In the embodiments described herein, the UE operates in the HSDPA mode, the data channels comprise High-Speed Downlink Shared channels (HS-DSCH) that carry downlink data, and the control channels comprise High-Speed Shared Control Channels (HS-SCCH) that carry control messages. The disclosed techniques, however, are applicable to other configurations and modes and to other types of channels, as well.

In accordance with the 3GPP specifications, HS-SCCH messages are masked with a UE-specific mask (or code) and comprise a Cyclic Redundancy Code (CRC). The UE-specific mask comprises a unique HS-DSCH Radio Network Identifier (UE H-RNTI), which the network assigns to the UE. When a UE attempts to decode a HS-SCCH message that is destined to another UE, the attempt is made using a UE-specific mask that differs from the mask used for encoding the message, which results in decoding failure.

In the disclosed embodiments, the UE estimates the noise level for the data channel (HS-SDCH) based on noise measurements performed on control messages conveyed over control channels (HS-SCCH), even when the control messages are destined to other UEs. By using the disclosed techniques, the UE is free to estimate the noise level over a much larger number of available control messages, not only its own control messages. As a result, noise level estimation accuracy is considerably improved. In various embodiments, the receiver uses the noise estimates, for different purposes, such as for computing soft metrics for decoding the HS-DSCH data and/or for estimating the HS-DSCH channel quality.

In some embodiments, the HS-SCCH messages comprise first and second parts. The first part is masked with the UE-specific mask. The second part is not masked, but includes a CRC that is masked with the UE-specific mask. In an embodiment, when receiving a HS-SCCH message for which the CRC is validated to be correct, both the first and second parts are assumed to be decoded correctly, and the UE uses both message parts for noise estimation. When CRC validation fails, the decoded first part cannot be assumed to be correct, and therefore the UE does not use the first part of the message for noise estimation. The decoded second part, however, may still be found to be sufficiently reliable for noise estimation because it is not masked with the UE-specific mask.

The UE can use various suitable methods for checking whether that the second part is valid for noise estimation. In an embodiment, the UE receiver re-encodes the decoded second part and compares the re-encoded data to the second part prior do decoding. If the resulting number of bit differences is smaller than a predefined threshold number, the second part is assumed to be valid and the UE uses it for noise estimation.

FIG. 1 is a block diagram that schematically illustrates a communication system 20, in accordance with an embodiment that is described herein. System 20 comprises a Base Station (BS) 28 that communicates with a mobile terminal 24. In UMTS terminology, BS 28 is also referred to as a NodeB. In the present example, mobile terminal 24 comprises a WCDMA UE that supports the HSDPA mode of operation. In alternative embodiments, terminal 24 may comprise any other suitable kind of mobile terminal that operates in accordance with any other suitable CDMA protocol.

The receiver section of terminal 24 comprises one or more receive antennas 32 for receiving downlink signals from BS 28. In an embodiment, the downlink signal comprises a WCDMA carrier that carries multiple WCDMA channels—typically a Primary Common Pilot Channel (P-CPICH), one or more High-Speed Shared Control Channels (HS-SCCH), and one or more High-Speed Downlink Shared channels (HS-DSCH). The P-CPICH comprises pilot symbols that are known in advance to the receiver and are used, for example, for synchronization of the UE to the BS and for performing channel measurements by the UE. The HS-SCCH carries control messages, whereas the HS-DSCH carries user data. Although the embodiments described herein refer mainly to P-CPICH, HS-SCCH and HS-DSCH, the disclosed techniques can be used with any other suitable type of pilot channel, control channel and data channel, respectively.

In the context of the present patent application and in the claims, the term "pilot channel" refers to a channel on which a base station transmits symbols or other waveforms that are known in advance to the UEs, e.g., for enabling the UEs to synchronize to the base station and/or perform parameter measurements. The term "data channel" refers to a channel that carries user data, and possibly other data, between the base station and a UE. The term "control channel" refers to a channel that carries control information rather than user data.

A Receiver Front End (RX FE) 36 down-converts the received signals from Radio Frequency (RF) to baseband and typically applies other functions such as filtering, amplification, gain control and digitization. The digitized baseband signals are provided to processing circuitry 40. FIG. 1 shows only the elements of circuitry 40 that are relevant to the disclosed noise estimation techniques, for the sake of clarity. The operations performed by the various elements of circuitry 40 are addressed in greater detail further below.

Among other received signals, processing circuitry 40 receives from RX FE 36 encoded HS-SCCH control messages. Encoding schemes for HS-SCCH are described, for example, in section 4.6 of 3GPP Technical Specification 25.212, entitled "$3^{rd}$ Generation Partnership Project; Technical Specification Group Radio Access Network; Multiplexing and channel coding (FDD)," (3GPP TS 25.212, version 11.7.0, Release 11), March, 2014, which is incorporated herein by reference.

In accordance with the 3GPP specification, the HS-SCCH can be of various types denoted type 1, type 2 and type 3. According to the 3GPP TS 25.212 specification, a HS-SCCH message (regardless of the HS-SCCH type) comprises two parts that are referred to herein as part1 and part2. The HS-SCCH coding scheme for part1 includes the following main operations:

Apply channel encoding using a rate-1/3 convolutional encoder, followed by a rate matching operation.
Mask the rate-matched bits with the UE-specific mask.
The coding scheme for part2 includes the following main operations:
Attach an error detection code. In the present example the error detection code comprises a Cyclic Redundancy Code (CRC) that is calculated over part1 and part2.
Mask the CRC with the UE-specific mask.
Apply channel encoding to the part2 message including the masked CRC using a rate-1/3 convolutional encoder, followed by a rate matching operation.

The different HS-SCCH types defined in the 3GPP TS 25.212 specifications employ coding schemes similar to the type1 scheme described above, with possibly different parameters such as the number of bits handled in part1 and part2 and different bits meaning. In the 3GPP TS 25.212 specifications the different HS-SCCH types use a fixed number of sixteen bits for the CRC. In alternative embodiments, however, any other suitable number of CRC bits can be used.

In some embodiments, processing circuitry 40 comprises a modem 44 that demodulates the HS-SCCH to produce HS-SCCH messages including part1 and part2 as described above. In some embodiments, part1 and part2 at the output of modem 44 comprise soft metrics. Each soft metric comprises a sign and a magnitude value, wherein the sign denotes the hard-decoded bit value (e.g., "0" or "1"), and the magnitude assigns a reliability or confidence level to the hard-decoded bit value. In some embodiments, the soft metrics comprise Log-Likelihood Ratios (LLRs). Alternatively, any other suitable soft metrics can also be used.

In an embodiment, processing circuitry 40 comprises separate processing paths for part1 and part2 of the HS-SCCH messages. An unmasking unit 48 unmasks part1 using the UE-specific mask. In an embodiment, unmasking unit 48 extracts the hard bits information from the sign part of the part1 LLRs, and then applies bit-wise XOR with the UE-specific mask.

A decoder1 52 then decodes part1 to produce decoded part1 bits. In an embodiment, decoder1 applies a suitable inverse rate-matching operation followed by a convolutional decoding operation. The operations that decoder1 applies are opposite to the respective operations performed in BS 28 at encoding time, so as to recover the decoded part1 bits. The decoded part1 bits are delivered to a noise estimator 54, which will be described further below.

Processing circuitry 40 comprises a decoder2 56 for decoding part2 of the HS-SCCH message. As described in an embodiment above, part2 is not masked with the UE-specific mask, but includes an error detection code (e.g., a CRC), which is masked with the UE-specific mask. Similarly to decoder1 52, when decoding a HS-SCCH message, decoder2 56 performs an inverse rate-matching operation followed by a convolutional decoding operation. In some embodiments, decoder1 52 and decoder2 56 comprise soft decoders (i.e., decoders that are configured to decode inputs that comprise soft metrics), such as, for example, Viterbi decoders for the convolutional code used for encoding in the BS.

In an embodiment, Decoded part2 comprises a CRC that was attached at encoding time, e.g., in accordance with the HS-SCCH encoding chain described above. A CRC validation unit 60 decodes the CRC to check the validity of the decoded part1 and part2 bits. In an embodiment, the CRC validation unit first unmasks the CRC bits in part2 using the UE-specific mask.

In an embodiment, CRC validation unit 60 calculates the CRC over the decoded part1 and part2 bits (i.e., excluding the CRC bits), and compares the outcome to the CRC attached in part2. When the two CRCs match, CRC validation unit 60 outputs a "CRC valid" indication. Otherwise, the CRC validation unit outputs a "CRC failure" indication. The decision of the CRC validation unit is delivered to noise estimator 54.

The CRC validation check in CRC validation unit 60 can fail because of various reasons. For example, when the HS-SCCH message is destined to another UE, CRC validation unit 60 performs unmasking using a UE-specific mask that is different from the UE-specific mask used at encoding time, which results in CRC failure.

Note that since the CRC calculation covers part1 (and part2), when unmasking unit 48 uses an incorrect mask, decoder1 52 typically produces an erroneous decoded part1, which causes the CRC validation check to fail, because the CRC is decoded correctly only when both decoded part1 and decoded part2 are error-free. As another example, even when unmasking the CRC bits with the correct UE-specific mask, some of the decoded part1 and/or decoded part2 bits may be erroneous (e.g., due to noise or interference), which causes the CRC validation check to fail.

In some embodiments, for reliable noise estimation using the HS-SCCH, part1 and part2 of the HS-SCCH messages should be decoded correctly with high probability. As explained above, when unmasking unit 48 uses a UE-specific mask that differs from the mask used for encoding, decoder1 typically decodes part1 incorrectly. Part2, however, does not depend on the UE-specific mask and therefore can be decoded with high reliability even when the UE-specific CRC validation check fails.

In the disclosed techniques, when CRC validation check succeeds, processing circuitry 40 concludes that both part1 and part2 were decoded correctly, and therefore both parts are valid for noise estimation. On the other hand, when the CRC validation check fails, in an embodiment, the processing circuitry applies a separate validity test to part2 alone, independently of the CRC validity test. Processing circuitry 40 can use any suitable method for testing that part2 is valid for the purpose of noise estimation. In example embodiments, processing circuitry 40 evaluates a reliability measure for decoded part2, and decided that part2 is valid when the reliability level exceeds a predefined level.

In an embodiment, re-encoder2 64 accepts the decoded part2 from decoder2 56 and performs re-encoding similarly to the encoding scheme used in the HS-SCCH encoding chain described above. Note that when part2 at the output of modem 44 is error-free, the cascade of decoder2 56 and re-encoder2 64 produces a re-encoded part2 that is equal to part2 prior to decoding, i.e., to part2 as generated at the BS side. On the other hand, when part2 at the output of modem 44 contains errors (e.g., due to noise or interference), part2 at the modem output typically differs from the re-encoded part2 at the output of re-encoder2 64. The number of differences is expected to be much higher, however, when part2 contains a number of errors that is larger than the maximal number of errors, which decoder2 56 can correct.

In an embodiment, a comparator 68 assesses a similarity measure between part2 prior to decoding (or hard-decoded bits thereof) and the re-encoded part2 output from re-encoder2 64. Comparator 68 is configured to use any suitable similarity measure, such as, for example, a bit-difference count, in an embodiment. Comparator 68 outputs the number of bit-differences to a part2 validation unit 72, which compares the number of detected differences to a predefined threshold number. Part2 validation unit 72 outputs an indication that part2 is valid for noise estimation when the number of differences is lower than the predefined threshold number, and invalid for noise estimation otherwise.

By setting the threshold number in part2 validation unit 72, in an embodiment, it is possible to trade between two conflicting metrics—a false alarm metric and a misdetection metric. The false alarm metric refers to the probability that part2 validation unit 72 wrongly decides that part2 is valid for noise estimation (even though part2 is actually invalid). The misdetection metric refers to the probability that part2 validation unit 72 wrongly decides that part2 is invalid for noise estimation (even though part2 is actually valid).

In some embodiments, the threshold number in part2 validation unit 72 is determined so as to keep the false alarm probability as low as possible, so that part2 will be used for noise estimation only when the probability that part2 was decoded correctly is high. The inventors have found that, in an embodiment, setting the threshold in part2 validation unit 72 to a value of ten, when part2 comprises eighty bits, provides a good tradeoff between the false alarm and misdetection probabilities over a wide range of communication channel conditions. Alternatively, any other suitable threshold number can be used.

In the embodiment of FIG. 1, noise estimator 54 accepts the decoded part1 from decoder1 52 and the decoded part2 from decoder2 56. Noise estimator 54 further accepts a CRC validity indication ("CRC valid" or "CRC failure") from CRC validation unit 60, and a part2 validation indication from part2 validation unit 72. Noise estimator 54 uses the CRC validity indication and the part2 validation indication to decide whether to use both part1 and part2, only part2, or none, for estimating the noise level for the HS-DSCH, as will be described in FIG. 2 below.

Noise estimator 54 can use any suitable method for noise estimation using part1 and/or part2 of the HS-SCCH message. Various methods for noise level estimation are described, for example, in U.S. Pat. No. 8,737,247, cited above, and in U.S. patent application Ser. No. 13/231,971, which is assigned to the assignee of the present patent application and whose disclosure is incorporated herein by reference. Alternatively, any other suitable noise estimation method can be used.

In an example embodiment, noise estimator 54 uses the part1 and/or part2 decoded bits to derive noise samples from the received signal, and evaluates certain statistical properties (e.g., variance) of the noise samples. In some embodiments, noise estimator 54 combines the HS-SCCH-based noise estimates with noise estimates from other sources, such as, for example, with noise estimates calculated over the P-CPICH.

Processing circuitry 40 can use the noise estimates calculated over the HS-SCCH messages for various purposes. In one embodiment, a HS-DSCH soft decoder 80 decodes soft HS-DSCH symbols in order to recover the data transmitted in the HS-DSCH. In an embodiment, soft decoder 80 computes soft decoding metrics (e.g., LLRs) based on the noise estimates provided by noise estimator 54, and decodes the HS-DSCH symbols using the soft decoding metrics.

In some embodiments, a Channel Quality Indicator (CQI) estimation module 84 estimates the channel quality on the HS-DSCH based on the noise estimates provided by noise estimator 54. The CQI is typically reported to BS 28 over an uplink channel (not shown in the figure). In yet another embodiment, processing circuitry 40 uses the noise estimate provided by noise estimator 54 as an input to an adaptive receiver loop that operates on the HS-DSCH and is adapted depending on HS-DSCH Signal-to-Noise Ratio (SNR). One example of such a loop is an adaptive equalizer whose taps are adapted depending on SNR on the data channel. Further alternatively, processing circuitry 40 may use the noise estimates for any other suitable purpose.

In some embodiments, BS 28 transmits multiple HS-SCCH messages to multiple respective UEs during a given Transmission Time Interval (TTI). In these embodiments, processing circuitry 40 in UE 24 can perform noise estimation using the disclosed techniques for one or more of the HS-SCCH messages in parallel, and combine the noise estimates from the one or more HS-SCCH messages to achieve improved overall noise level estimate.

The UE and processing circuitry configurations shown in FIG. 1 are simplified example configurations, which are depicted solely for the sake of clarity. In alternative embodiments, any other suitable configurations can also be used. Some UE elements that are not mandatory for understanding of the disclosed techniques have been omitted from the figure for the sake of clarity. The different elements of UE 24 may be implemented using dedicated hardware, such as using one or more Application-Specific Integrated Circuits (ASICs) and/or Field-Programmable Gate Arrays (FPGAs). Alternatively, some elements may be implemented using software executing on programmable hardware, or using a combination of hardware and software elements.

In some embodiments, some or all of the elements of UE 24 are fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

Figure 2:
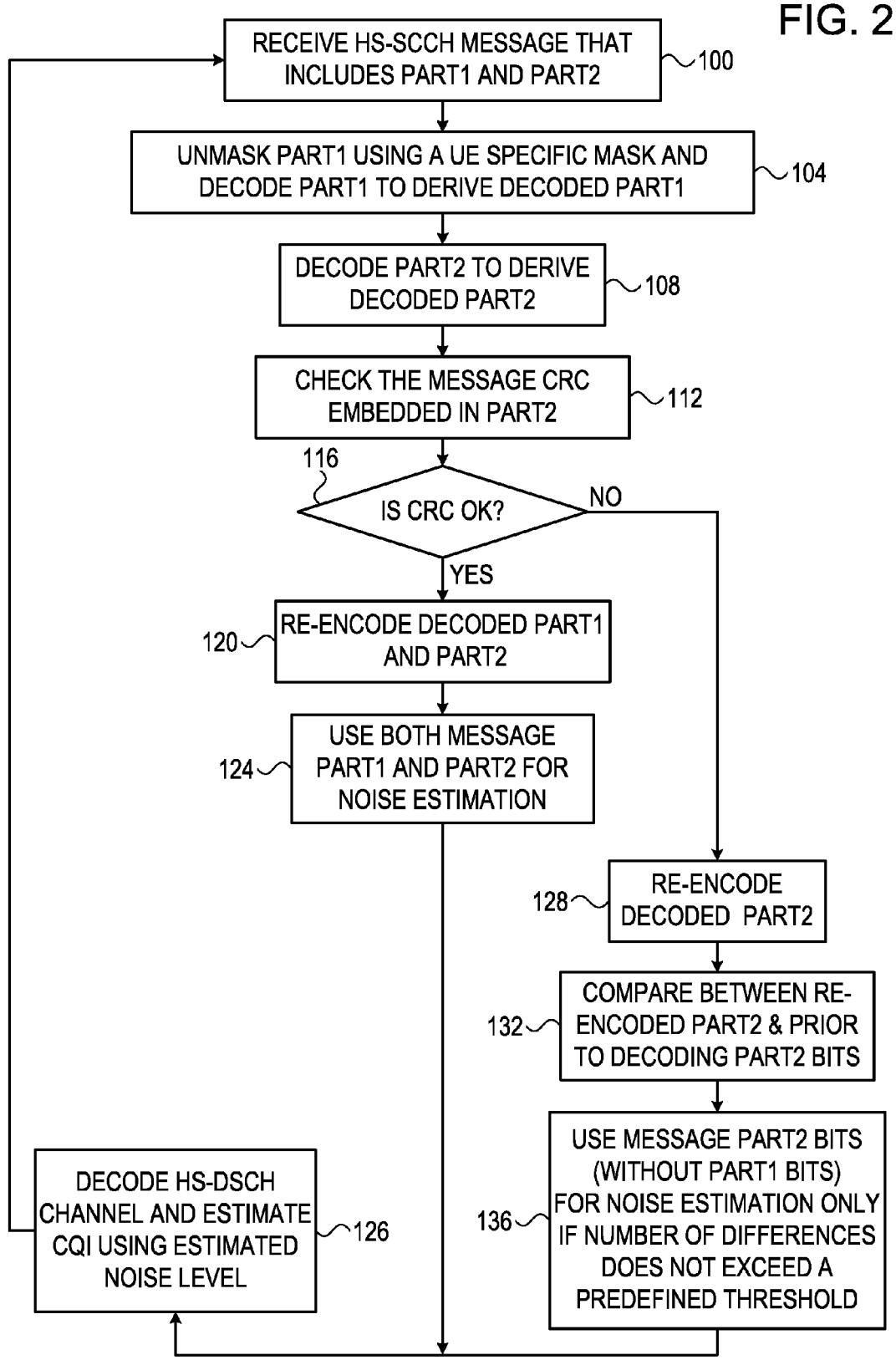
FIG. 2 is a flow chart that schematically illustrates a method for noise level estimation for a data channel of a mobile terminal based on control messages destined for other mobile terminals, in accordance with an embodiment that is described herein.

FIG. 2 is a flow chart that schematically illustrates a method for noise level estimation for a High-Speed Downlink Shared channel (HS-DSCH) based on High-Speed Shared Control Channel (HS-SCCH) messages destined for other mobile terminals, in accordance with an embodiment that is described herein.

The method begins with modem 44 receiving a HS-SCCH message, at a reception operation 100. The HS-SCCH message comprises two parts, denoted part1 and part2 as described above. Modem 44 demodulates the HS-SCCH message to extract part1 and part2 of the message, in an embodiment. At an unmasking and decoding operation 104, unmasking unit 48 receives part1 from modem 44 and unmasks part1 using the UE-specific mask of the UE.

In an embodiment, unmasking unit 48 performs the unmasking by negating the sign values of the part1 soft metrics based on the respective UE-specific mask bits (e.g., a '0' mask bit indicates to retain the respective sign value of the soft metric, whereas a '1' mask bit indicates to negate the respective sign value.) Alternatively, any other suitable unmasking operation can be used. Further at operation 104, decoder1 52 decodes the unmasked part1 to derive decoded part1, which is delivered to noise estimator 54.

At a part2 decoding operation 108, decoder2 56 accepts part2 of the HS-SCCH message from modem 44, and decodes part2 to derive decoded part2. At a CRC checking operation 112, CRC validation unit 60 validates the CRC attached to part2. In an embodiment, CRC validation unit 60 computes a CRC over the decoded part1 and part2, and compares the computed CRC to the CRC embedded in part2. At a decision operation 116, when the CRC computed at operation 112 matches the CRC embedded in part2, the method proceeds to a first re-encoding operation 120, in which re-encoder2 64 re-encodes the decoded part2, and another re-encoder (not shown in the figure) re-encodes the decoded part1.

At a first noise estimation operation 124, noise estimator 54 uses decoded part1 and decoded part2 (or the re-encoded versions of part 1 and part2), as well as the soft metrics of part1 and part2 at the output of modem 44, for noise estimation as described above. If at operation 116 above the computed CRC does not match the CRC embedded in part2, the method proceeds to a second re-encoding operation 128, in which re-encoder2 64 re-encodes the decoded part2. At a comparison operation 132, comparator 68 compares between re-encoded part2 from operation 128 and part2 prior to decoding (or hard-decoded bits of part2), and outputs the number of bit-differences to part2 validation unit 72, which indicates to noise estimator 54 that part2 is valid only when the number of bit-differences does not exceed a predefined threshold.

At a second noise estimation operation 136, noise estimator 54 uses part2 (without part1) for noise estimation based on the validity indication from part2 validation unit 72.

Regardless of whether the noise level for the HS-DSCH was estimated over part1 or over both part1 and part2, processing circuitry 40 uses the estimated noise level for HS-DSCH decoding and/or CQI estimation, at a data decoding/estimation operation 126. The method then loops back to operation 100 to receive subsequent HS-SCCH messages.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
    in a communication terminal, receiving a signal that carries a data channel and at least a control-channel message, which has a first part and a second part, wherein the second part comprises a second-part message and a Cyclic Redundancy Check (CRC) code computed at least over the second-part message, and wherein the first part and the CRC code are masked with a terminal-specific code;
    decoding the second part to produce a decoded second part including the second-part message;
    decoding the CRC code that was computed at least over the second-part message; and
    estimating a noise level for the data channel based (i) on both the first part and the decoded second part, when decoding the CRC code succeeds, or (ii) on the decoded second part but not on the first part, when decoding the CRC code fails.

2. The method according to claim 1, wherein decoding the second part comprises decoding the second part by the communication terminal even though the control-channel message is not addressed to the communication terminal.

3. The method according to claim 1, comprising identifying that the control-channel message is not addressed to the communication terminal in response to detecting one or more errors when decoding the CRC code.

4. The method according to claim 3, wherein identifying that the control-channel message is not addressed to the communication terminal comprises unmasking the terminal-specific code prior to decoding the CRC code.

5. The method according to claim 1, wherein the second part is encoded with an Error Correction Code (ECC), wherein decoding the second part comprises decoding the ECC to produce decoded bits, and verifying that the decoded second part is valid by:
    deriving hard bits from the second part;
    re-encoding the decoded bits with the ECC to produce re-encoded bits; and
    assessing a similarity measure between the hard bits and the re-encoded bits.

6. The method according to claim 5, wherein assessing the similarity measure comprises evaluating a number of bit differences between the hard bits and the re-encoded bits, and comparing the number to a predefined threshold number.

7. The method according to claim 1, wherein estimating the noise level comprises evaluating a reliability level of the decoded second part and deciding that the second part is suitable for noise-level estimation when the reliability level exceeds a predefined level.

8. The method according to claim 1, and comprising combining the estimated noise level with an additional noise-level estimate obtained from an additional control-channel message that is received by the communication terminal but addressed to another communication terminal.

9. The method according to claim 1, comprising combining the estimated noise level with an additional noise-level estimate obtained from a pilot channel carried by the received signal.

10. The method according to claim 1, comprising using the estimated noise level for estimating a Channel Quality Indicator (CQI) that indicates a quality of the data channel.

11. The method according to claim 1, comprising using the estimated noise level to derive soft decoding information to be used for recovering data messages sent over the data channel.

12. The method according to claim 1, comprising using the estimated noise level to adapt an adaptive loop that operates on the data channel.

13. Apparatus, comprising:
    a receiver, which is configured to receive a signal that carries a data channel and at least a control-channel message, which has a first part and a second part, wherein the second part comprises a second-part message and a Cyclic Redundancy Check (CRC) code computed at least over the second-part message, and wherein the first part and the CRC code are masked with a terminal-specific code; and processing circuitry, which is configured to:
  decode the second part to produce a decoded second part including the second-part message;
  decode the CRC code that was computed at least over the second-part message; and
  estimate a noise level for the data channel based (i) on both the first part and the decoded second part, when decoding the CRC code succeeds, or (ii) on the decoded second part but not on the first part, when decoding the CRC code fails.

14. The apparatus according to claim 13, wherein the processing circuitry is configured to decode the second part even though the control-channel message is not addressed to the communication terminal.

15. The apparatus according to claim 13, wherein the processing circuitry is configured to identify that the control-channel message is not addressed to the communication terminal in response to detecting one or more errors when decoding the CRC code.

16. The apparatus according to claim 13, wherein the second part is encoded with an Error Correction Code (ECC), wherein the processing circuitry is configured to decode the ECC to produce decoded bits, and to verify that the decoded second part is valid by:
  deriving hard bits from the second part;
  re-encoding the decoded bits with the ECC to produce re-encoded bits; and
  assessing a similarity measure between the hard bits and the re-encoded bits.

17. The apparatus according to claim 13, wherein the processing circuitry is configured to combine the estimated noise level with an additional noise-level estimate obtained from an additional control-channel message that is received by the communication terminal but addressed to another communication terminal.

18. The apparatus according to claim 13, wherein the processing circuitry is configured to use the estimated noise level for estimating a Channel Quality Indicator (CQI) that indicates a quality of the data channel, for deriving soft decoding information to be used for recovering data messages sent over the data channel, or for adapting an adaptive loop that operates on the data channel.

19. A mobile communication terminal comprising the apparatus of claim 13.

20. A chipset for processing signals in a mobile communication terminal, comprising the apparatus of claim 13.

* * * * *